United States Patent
Woxberg et al.

(10) Patent No.: US 12,040,872 B2
(45) Date of Patent: Jul. 16, 2024

(54) BEAM-INDEX BASED DATA DISTRIBUTION FOR SCALABLE DISTRIBUTED RADIO SYSTEMS

(71) Applicant: Telefonaktiebolaget LM Ericsson (publ), Stockholm (SE)

(72) Inventors: Fredrik Woxberg, Västra Frölunda (SE); Mikael Kjellberg, Mölndal (SE); Christophe Kefeder, Massy (FR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1 day.

(21) Appl. No.: 17/923,548

(22) PCT Filed: May 7, 2020

(86) PCT No.: PCT/SE2020/050474
§ 371 (c)(1),
(2) Date: Nov. 4, 2022

(87) PCT Pub. No.: WO2021/225485
PCT Pub. Date: Nov. 11, 2021

(65) Prior Publication Data
US 2023/0208497 A1    Jun. 29, 2023

(51) Int. Cl.
*H04L 5/12* (2006.01)
*H04B 7/0456* (2017.01)
*H04B 7/06* (2006.01)

(52) U.S. Cl.
CPC ......... *H04B 7/0695* (2013.01); *H04B 7/0456* (2013.01); *H04B 7/0691* (2013.01)

(58) Field of Classification Search
CPC .. H04B 7/0695; H04B 7/0456; H04B 7/0691; H04B 7/024; H04B 7/0617; H04W 88/085

(Continued)

(56) References Cited

U.S. PATENT DOCUMENTS

| 10,205,571 B2 | 2/2019 | Ahn et al. |
| 2010/0118839 A1* | 5/2010 | Malladi .................. H04J 11/00 370/336 |

(Continued)

FOREIGN PATENT DOCUMENTS

| EP | 2647133 A1 | 10/2013 |
| EP | 3284185 A1 | 2/2018 |

(Continued)

OTHER PUBLICATIONS

International Search Report and Written Opinion issued in International Application No. PCT/SE2020/050474 dated Mar. 25, 2021 (11 pages).

(Continued)

*Primary Examiner* — Helene E Tayong
(74) *Attorney, Agent, or Firm* — Rothwell, Figg, Ernst & Manbeck, P.C.

(57) ABSTRACT

The present disclosure relates to a method for transporting and distributing data (2) between a baseband, BB, unit (3) and two or more radio units (4) comprised in a communications network (1) arranged to cover a service area (6). The method comprises defining (S1) a logical grid of beams matrix, GoB, (5) associated with a carrier frequency band ($B_0$, $B_1$, $B_2$, $B_3$, $B_4$, $B_5$, $B_6$, $B_7$) of the communications network (1), wherein the GoB (5) comprises a set (S) of beam indices (BI), and partitioning (S2) the set (S) of beam indices into disjoint subsets ($DS_1$, $DS_2$, $DS_3$, $DS_4$) of at least one beam index (BI) each. The method further comprises mapping (S3) each of the two or more radio units (4) to one disjoint subset ($DS_1$, $DS_2$, $DS_3$, $DS_4$) such that each disjoint subset ($DS_1$, $DS_2$, $DS_3$, $DS_4$) is associated with a single radio unit (4), and transporting (S5) the data (2) between the BB unit (3) and the two or more radio units (4) and distributing the transported data (2) between the radio units (Continued)

(4) based on the disjoint subsets ($DS_1$, $DS_2$, $DS_3$, $DS_4$) of beam indices (BI).

26 Claims, 9 Drawing Sheets

(58) Field of Classification Search
USPC .......................................................... 375/262
See application file for complete search history.

(56) References Cited

U.S. PATENT DOCUMENTS

| | | |
|---|---|---|
| 2014/0225776 A1 | 8/2014 | Harel et al. |
| 2017/0237495 A1 | 8/2017 | Lee et al. |
| 2018/0048357 A1 | 2/2018 | Stewart et al. |
| 2018/0076914 A1 | 3/2018 | Zhou et al. |
| 2019/0253108 A1* | 8/2019 | Zhang ................. H04B 7/0695 |

FOREIGN PATENT DOCUMENTS

| | | |
|---|---|---|
| EP | 3560109 A1 | 10/2019 |
| JP | 2019-012937 A | 1/2019 |
| WO | 2015/100315 A1 | 7/2015 |

OTHER PUBLICATIONS

Zirwas, W. et a., "Key Solutions for a Massive MIMO FDD System", IEEE, 2017 (7 pages).
Huawei et al., "Discussion on beam management aspects for DL MIMO", 3GPP TSG RAN WG1 Meeting #87, R1-1611670, Reno, USA, Nov. 14-18, 2016 (7 pages).

* cited by examiner

BEAM-INDEX BASED DATA DISTRIBUTION FOR SCALABLE DISTRIBUTED RADIO SYSTEMS

CROSS REFERENCE TO RELATED APPLICATIONS

This application is a 35 U.S.C. § 371 National Stage of International Patent Application No. PCT/SE2020/050474, filed 2020 May 7.

TECHNICAL FIELD

The present disclosure relates to a wireless communication system comprising a baseband (BB) unit and two or more radio units arranged to cover a service area. There are disclosed methods and devices for transporting data between baseband unit and radio units.

BACKGROUND

Recent cellular communication networks, such as the fifth generation (5G) systems defined by the third generation partnership program (3GPP) often use more than one radio unit, or transmission point (TRP), to cover a given service area, i.e., some geographical region or a floor of a multistory building.

The number of radio units or TRPs in future cellular communication networks are foreseen to be quite large, at least in part since carrier frequencies are increasing, which implies a reduced radio range for each individual radio unit. Thus, it will become even more important that both hardware unit cost and operating costs per radio unit are kept low, and in particular that the cost for transporting data to and from the radio units is low due to the large number of radio units.

Advanced antenna systems (AAS) comprise multiple antenna elements organized in antenna arrays which enable the generation of antenna patterns comprising a plurality of antenna beams. These beams may be relatively wide in order to cover larger portions of the service area, or more narrow in order to increase antenna gain and also limit interference between users. For instance, a wide beam may be used when a user initially connects to the network, while the narrower beams can be used to carry user traffic to and from already connected users.

Traditional sector coverage by a single radio unit is often divided into spatially separated sub-areas, i.e., sectors, which are serviced by a set of fixed or pre-configured antenna beams. Each beam is associated with a respective beam index which identifies the beam. The beam indices can therefore be used to indicate to which area a given transmission is to be directed. The beam indices are often arranged in a logical grid of beams matrix (GoB) which facilitates scheduling of radio transmissions to users and handling user mobility throughout the service area.

Today a baseband (BB) unit is normally connected to the one or more radio units. The baseband unit performs cell and user related signal processing for the radio carriers of the communication system. Beam indices are signaled from the BB unit to the radio unit to provide information regarding how to configure the antenna at the radio unit for a given piece of data to be transmitted or received by the radio unit.

To efficiently manage user mobility and radio resources, the BB typically allocates specific hardware (HW) resources for cell and carrier processing to each radio unit. However, as networks become denser, there is a need for BB resource handling and data transport solutions which are more scalable, and which are able to handle a larger number of radio units in a cost-efficient manner.

SUMMARY

It is an object of the present disclosure to provide methods, devices and systems which enable scaling of a wireless communication system in a cost efficient manner.

Said object is obtained by means of a method for transporting and distributing data between a baseband (BB) unit and two or more radio units comprised in a communications network arranged to cover a service area. The method comprises defining a logical grid of beams matrix (GoB) associated with a carrier frequency band of the communications network, wherein the GoB comprises a set of beam indices, and partitioning the set of beam indices into disjoint subsets of at least one beam index each. The method further comprises mapping each of the two or more radio units to one disjoint subset such that each disjoint subset is associated with a single radio unit, and transporting the data between the BB unit and the two or more radio units and distributing the transported data between the radio units based on the disjoint subsets of beam indices.

This means that since no beam index is part of more than one disjoint sub-set, and no radio unit is mapped to more than one disjoint sub-set, the disjoint sub-sets can be used both as addresses to specific radio units, and also to identify a specific beam at the addressed radio unit. The BB unit does not need to keep track of which radio unit that listens to which sub-set of beam indices, and can perform the scheduling over the GoB in the same manner as is done for a single radio unit coverage area. This in turn enables deployment of a larger number of radio units in a cost-efficient manner.

According to some aspects, the method comprises performing per cell scheduling, by the BB unit, over the service area, based on the GoB.

This means that the BB unit treats the system of distributed radio units as a single radio unit covering a service area with a plurality of beams organized according to the GoB, and simply schedules wireless devices based on, e.g., reported channel quality for the different beams. The BB unit does not need to know that the different beam indices have been partitioned and assigned to different radio units in order to perform the scheduling operation.

According to some aspects, the method comprises associating each beam index in a disjoint subset of beam indices with an antenna radiation pattern of the radio unit mapped to the disjoint subset.

This means that also particular beams of a radio unit may be addressed by the BB unit. In other words, due to the partitioning, each subset represents an address to a given radio unit, and the individual beam indices within a subset addresses specific beams at the associated radio unit.

According to some aspects, the method comprises partitioning the GoB into an integer number N of wide beams, where each wide beam is further partitioned into one or more subordinate traffic beams.

This means that both beam width and beam coverage may vary between implementations and also over different networks.

According to some aspects, the method comprises partitioning the GoB such that each disjoint subset of beam indices comprises at least one beam index corresponding to a unique wide beam selected from the N wide beams in the GoB.

According to some aspects, the method comprises partitioning the GoB such that each disjoint subset of beam indices comprises at least one beam index corresponding to one or more unique traffic beams selected within a corresponding wide beam.

The partitioning means that a set of available beam indices is divided into groups, where no beam index is part of more than one group. Above two examples of partitioning are provided.

According to some aspects, the transporting further comprises multiplexing the data between the BB unit and the radio units onto a common data flow by one or more beam-index based multiplexers (BI-MUX) based on the mapping between the disjoint subsets of beam indices and the radio units.

According to some aspects, the multiplexing comprises switching in and out active data slots associated with a radio unit onto a common time division duplex (TDD) data channel between the BB unit and radio units by the BI-MUX.

This means that the radio units wait for their turn to transmit on the common channel, and when the time comes add data to the common channel.

According to some aspects, the multiplexing comprises broadcasting the data on a TDD downlink (DL) data channel from the BB unit to each of the radio units addressed by beam index, and combining the data from the radio units to the BB unit on a TDD uplink (UL) data channel from the radio units to the BB unit. The combining comprises inactive radio units generating an all zero output, whereby multiple uplink transmissions from the radio units can be combined by addition of the outputs from the radio units in a TDD slot.

This enables efficient multiplexing.

According to some aspects, the transporting comprises multiplexing the data based on a serial configuration of BI-MUXs where each radio unit is connected to a respective common public radio interface (CPRI) or evolved CPRI (eCPRT) beam-index based switch in the serial configuration.

According to some aspects, the transporting comprises multiplexing the data based on a centrally arranged BI-MUX comprised in the baseband unit or on a phased array antenna module (PAAM) of the communication system.

This means that many different kinds of BI-MUX configurations are possible and can be tailored for a specific desired setup.

According to some aspects, the method comprises partitioning the set of beam indices into one or more broadcasting subsets in addition to the disjoint subsets, and mapping each of the one or more broadcasting subsets of beam indices to two of more radio units.

This means that when the BB unit addresses one of the broadcasting subsets, more than one radio unit may be configured to receive and transmit the data over its coverage area, effectively providing a broadcasting function which can be used by the BB unit to address larger regions in a broadcast manner.

This object is also obtained by means of communication systems and beam-indexed based multiplexers that are associated with the above advantages.

BRIEF DESCRIPTION OF THE DRAWINGS

The present disclosure will now be described more in detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
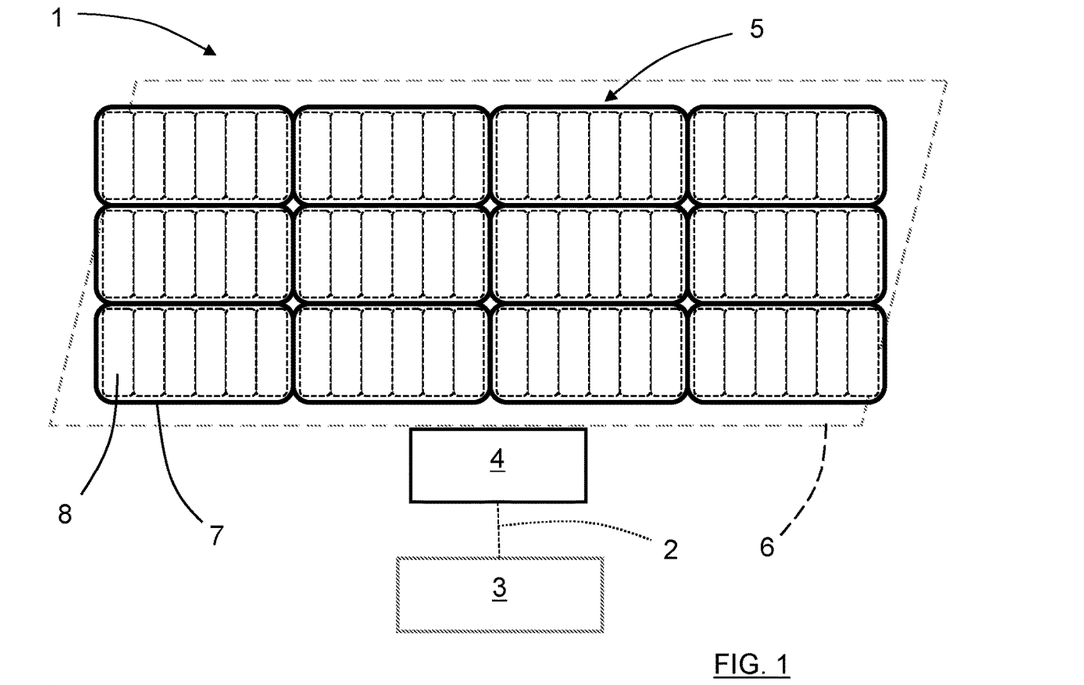
FIG. 1 shows schematic views of a wireless communication system.

FIG. 1 illustrates a communications network 1 comprising a BB (baseband) unit 3 arranged to transfer data 2 to and from a radio unit 4. The communications system 1 may be a cellular access system such as the 3GPP (third generation partnership program) defined 5G (fifth generation) communication network, but other access networks and communication systems may also be envisioned.

The radio unit 4 comprises an AAS (Advanced Antenna System) which enables the radio unit to generate antenna beams in different directions and with different lobe widths. Various AAS are previously well-known and will therefore not be discussed in more detail herein.

The radio unit 4 is, by the AAS, arranged to cover a service area 6 by a number of wide beams 7 and a number of more narrow traffic beams 8. Normally, the width of an antenna beam is given in terms of degrees of azimuth angle, but other measures are equally applicable. The width of a 'wide beam' may vary but are commonly on the order of 20 degrees wide measured in azimuth, while the traffic beams may be on the order of 5 degrees in azimuth angle.

The wide and narrow beams in FIG. 1 are hierarchically organized, such that one 'parent' wide beam covers the same area as a number of 'child' beams which are narrower. However, beams can also be organized differently, e.g., as a flat (non-hierarchical) structure with relatively little overlap between beams, or more a ad-hoc structure with narrow and wide beams arranged with little apparent order to cover the service area 6.

The beams are organized in a logical grid of beams matrix (GoB) 5, and the BB unit 3 signals beam indices to the radio unit 4 in order to let the radio unit know how to configure its AAS for transmission or reception of a given piece of data.

Normally, a GoB 5 is defined for a single radio unit 4, and the BB unit 3 uses the beam indices in the GoB to signal which antenna beam to use for a given radio unit 4. Resources in the BB unit 3 are assigned to support one GoB 5 per radio unit 4. This arrangement is associated with some drawbacks. For instance, the number of radio units in the communication system 1 drives both interface cost and processing requirements at the BB unit, since separate resources are commissioned for each radio unit connected to a BB unit. These resources may, e.g., be ports, interfaces, signal processing resources, memory areas, or the like.

The present disclosure presents an idea which decouples BB processing from the radio distribution in the communications network 1. Instead of defining one GoB per radio unit, the beam indices are partitioned into disjoint subsets, where each disjoint subset is assigned to the beams of a respective radio unit. Thus, two or more radio units can be supported by the resources for a single GoB, which saves both processing resources and interfaces at the BB unit. The solution is scalable since additional radio resources can be added to the system without re-configuring BB unit interfaces; all that is required is a simple re-configuration of the GoB at the BB unit 3. Thus, by means of the present disclosure, it becomes possible to reuse operation principles between radio environments and thereby reduce BB scaling needs.

The present disclosure also relates to a method for distributing data between the different radio units in the communication system 1. This method is based on a beam-index based multiplexing concept, where the beam indices are used as base for the data distribution. A new type of network element, the beam-index based multiplexer, is introduced and is able to forward data segments to an intended radio unit based on beam-index. Such a beam-index based multiplexer can be arranged in various ways as will be discussed in more detail below with reference to FIG. 6-11.

Figure 2:
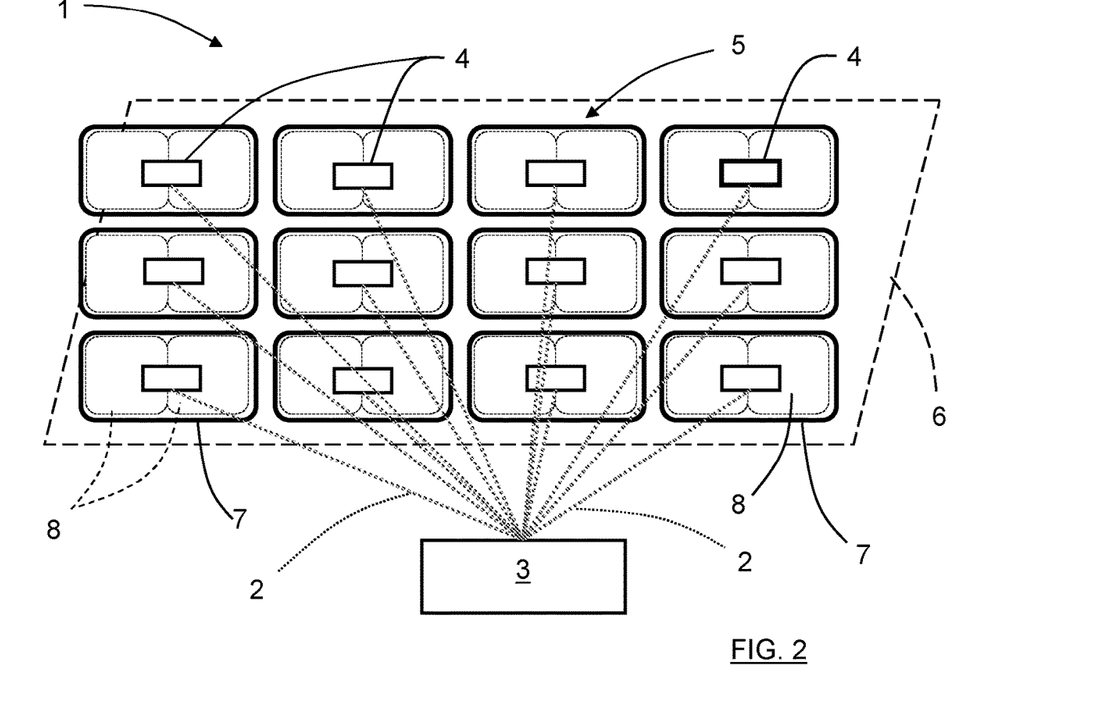
FIG. 2 shows schematic views of a wireless communication system.

FIG. 2 schematically illustrates a service area 6 covered by a plurality of radio units 4. Each radio unit 4 is here able to generate a wide beam 7 and two more narrow beams 8 which together cover approximately the same area. The schematic similarity between the wide and more narrow beams in FIG. 1 compared to the wide and narrow beams in FIG. 2 is noted. It is appreciated that the BB unit 3 does not necessarily need to know exactly what radio unit which is transmitting and receiving data from a wireless device in the communications network 1, all it really needs to know is what beam to use in order to send data to a given wireless device, and which beam to use in order to receive data from the wireless device. According to the present disclosure, the BB unit 3 maintains a GoB for the service area 6 and performs per cell scheduling over the GoB 5 to service the users currently located within the service area. The data is then distributed back and forth between the BB unit 3 and the radio units 4 by means of beam-index based multiplexers using the beam index from the GoB as address.

The beam-index based multiplexer or switch logic may be used on the BB unit side to expand the number of interfaces towards radios, or on the radio unit side to share a single data flow between several local radios, or even in between BB unit and radio units to aggregate flows from different radios, as will be discussed more in detail later.

Functionally, the Switch/MUX (multiplexer) can be implemented either by switching in/out active data slots (to/from the Beam-Indexed radio) onto a shared data flow, or simply by broadcasting data in downlink (DL) from the BB unit 3 to the radio units 4 and combining data in uplink (UL) from the radio units to the BB unit. The beam indices will tell radios whether to transmit/receive and non-active receivers may simply produce zeros to allow a dumb add combination in UL, as will be explained in more detail below.

Figure 3:
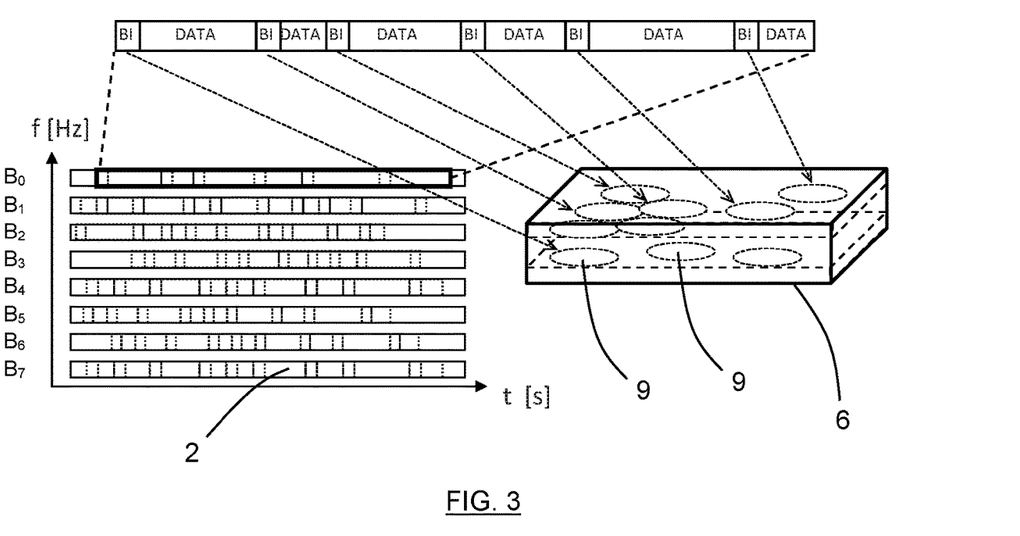
FIG. 3 illustrates data transport in a communication system.

FIG. 3 illustrates how data can be transported in a communication network 1 based on beam index (BI). Each radio unit 4 may be associated with one or more carriers $B_0$, $B_1$, ..., $B_7$. A carrier is an assigned frequency band in which the radio unit operates to service wireless devices in its coverage area. The frequency band of a carrier may, e.g., be about 100 MHz wide in a 5G access network. According to the present disclosure, the beam index identifies which radio(s) that should transmit/receive in a certain timeslot. This enables dynamic sharing of cell resources using time-division multiplex (TDM) principles where all resources (timeslots) can be allocated to one area or be divided between several, thus satisfying both requirements for coverage as well as local capacity (peak rate).

Figure 4:
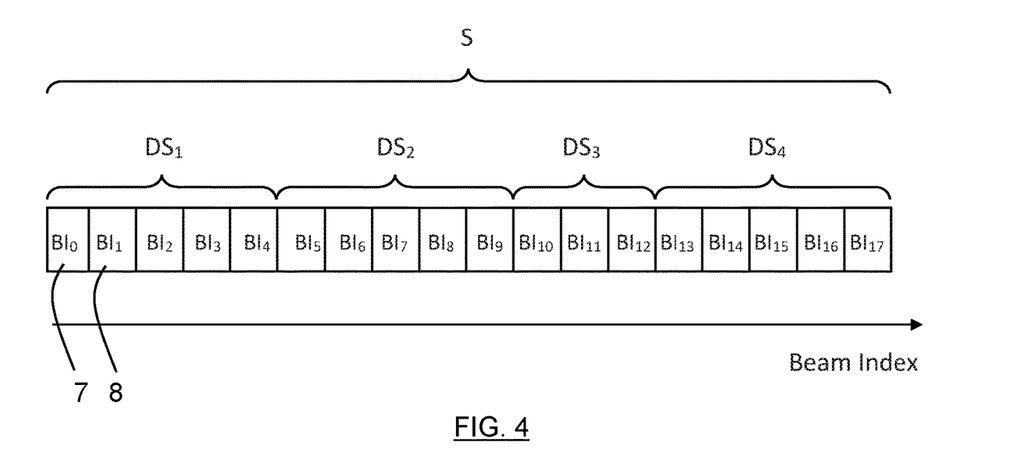
FIG. 4 schematically illustrates partitioning of a set of beam indices.
Figure 12A:
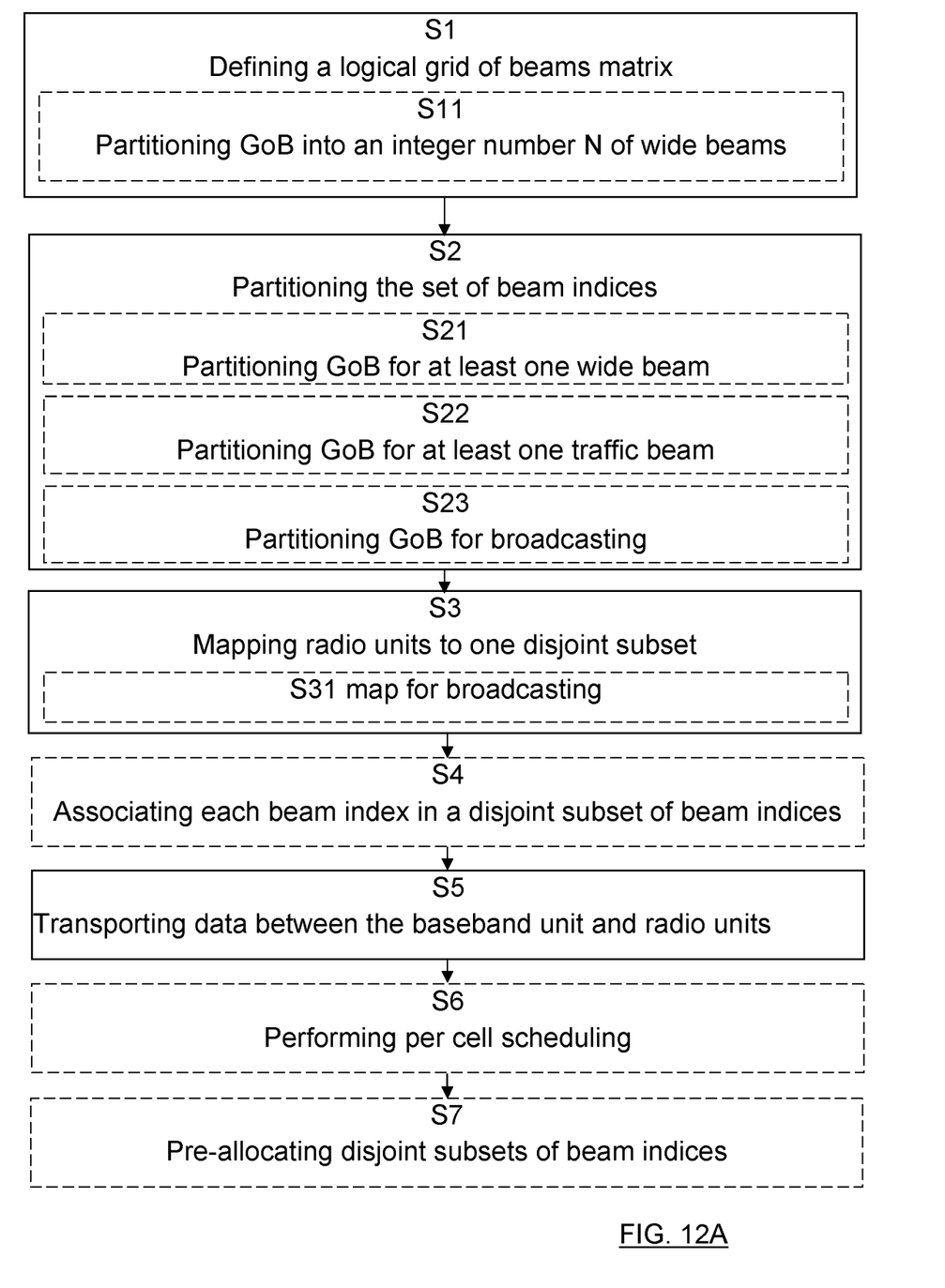
FIG. 12A shows flowcharts for methods according to the present disclosure.
Figure 12B:
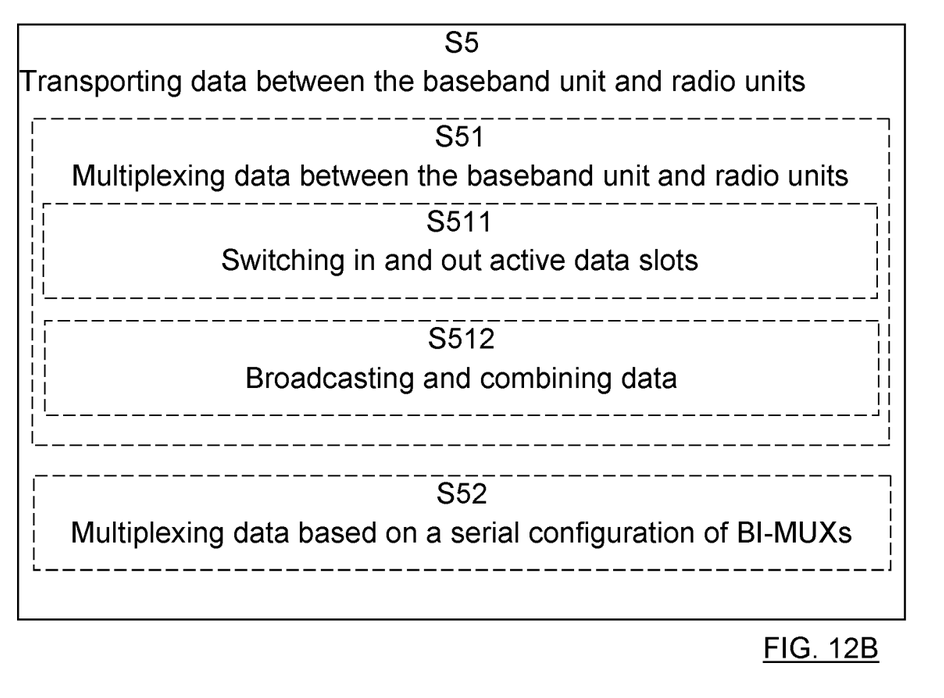
FIG. 12B shows flowcharts for methods according to the present disclosure.

To summarize, with reference to FIG. 2, FIG. 4 and also to FIGS. 12A and 12B, the present disclosure relates to a method for transporting and distributing data 2 between a baseband (BB) unit 3 and two or more radio units 4 comprised in a communications network 1 arranged to cover a service area 6. The method comprises defining S1 a logical grid of beams matrix (GoB) 5 associated with a carrier frequency band $B_0$, $B_1$, $B_2$, $B_3$, $B_4$, $B_5$, $B_6$, $B_7$ of the communications network and comprising a set S of beam indices BI. The GoB may be hierarchically organized as exemplified in FIG. 2 with 'parent' and 'child' lobes, or in some other manner, e.g., in a flat manner or in a more ad-hoc manner.

According to some aspects, the method comprises partitioning S11 the GoB into an integer number N of wide beams 7, where each wide beam is further partitioned into one or more subordinate traffic beams 8 which is more narrow than the wide beam. It is appreciated that hardware effects and effects in the radio propagation environment may have an effect on the actual radiation pattern of an antenna. Thus, both beam width and beam coverage may vary between implementations and also over different networks.

The method also comprises partitioning S2 the set S of beam indices into disjoint subsets $DS_1$, $DS_2$, $DS_3$, $DS_4$ of at least one beam index BI each, as exemplified in FIG. 4. Here, each subset comprises four beam indices, but that is of course only an example. This means that the set of available beam indices is divided into groups, where no beam index is part of more than one group. For instance, the partitioning optionally comprises partitioning S21 the GoB such that each disjoint subset $DS_1$, $DS_2$, $DS_3$, $DS_4$ of beam indices BI comprises at least one beam index $BI_0$ corresponding to a unique wide beam 7 selected from the N wide beams in the GoB 5. The partitioning may also comprise partitioning S22 the GoB such that each disjoint subset $DS_1$, $DS_2$, $DS_3$, $DS_4$ of beam indices BI comprises at least one beam index $BI_1$ corresponding to one or more unique traffic beams 8 selected within a corresponding wide beam 7. This is schematically illustrated in FIG. 4.

Each of the subsets is then mapped S3 to a radio unit 4 such that each disjoint subset $DS_1$, $DS_2$, $DS_3$, $DS_4$ is associated with a single radio unit 4. Since no beam index is part of more than one disjoint sub-set, and no radio unit is mapped to more than one disjoint sub-set, the disjoint sub-sets can be used both as addresses to specific radio units, and also to identify a specific beam at the addressed radio unit. As discussed above, the BB unit 3 actually does not need to keep track of which radio unit that listens to which sub-set of beam indices. The BB unit will simply keep track of the signal quality that the different wireless devices in the service area experiences for the different antenna beams, and perform the scheduling over the GoB in the same manner as is done for a single radio unit coverage area.

When a new radio unit is added to the system, the GoB can be expanded with new beam indices which are assigned to the new radio unit, and the BB unit 3 can then start to use the new radio unit without further re-configuration of the BB unit hardware or interfaces, which of course presents an important advantage.

As will be discussed in more detail below, the methods disclosed herein optionally also comprise defining broadcasting subsets of beam indices which can be assigned to more than one radio unit. These broadcasting subsets of beam indices can be used to trigger broadcasts of data, since more than one radio unit will listen to the same beam index. Thus, if the BB unit 3 wishes to transmit a given piece of data from more than one radio unit, then it can associate the data with a beam index selected from a broadcasting subset of beam indices. In other words, the method optionally comprises partitioning S23 the set S of beam indices into one or more broadcasting subsets in addition to the disjoint subsets $DS_1$, $DS_2$, $DS_3$, $DS_4$, and mapping S31 each of the one or more broadcasting subsets of beam indices to two of more radio units 4. This means that when the BB unit 3 addresses one of the broadcasting subsets, more than one radio unit may be configured to receive and transmit the data over its coverage area, effectively providing a broadcasting function which can be used by the BB unit to address larger regions in a broadcast manner.

According to some aspects, the method comprises associating S4 each beam index in a disjoint subset $DS_1$, $DS_2$, $DS_3$, $DS_4$ of beam indices with an antenna radiation pattern 9 of the radio unit 4 mapped to the disjoint subset. This means that also particular beams of a radio unit may be addressed by the BB unit 3. In other words, due to the partitioning, each subset represents an address to a given radio unit, and the individual beam indices within a subset addresses specific beams at the associated radio unit.

The methods discussed herein also comprise transporting S5 the data 2 between the BB unit 3 and the two or more radio units 4 and distributing the transported data 2 between the radio units 4 based on the disjoint subsets $DS_1$, $DS_2$, $DS_3$, $DS_4$ of beam indices. This transporting and distribution may be performed based on the new type of multiplexing function based on the beam indices, i.e., the beam-index based multiplexing function discussed above.

According to some aspects, with reference to the discussion above in connection to FIG. 2, the method comprises performing S6 per cell scheduling, by the BB unit 3, over the service area 6, based on the GoB 5. Thus, the BB unit treats the system of distributed radio units as a single radio unit covering a service area with a plurality of beams organized according to the GoB, and simply schedules wireless devices based on, e.g., reported channel quality for the different beams. The BB unit 3 does not need to know that the different beam indices have been partitioned and assigned to different radio units in order to perform the scheduling operation.

Figure 5:
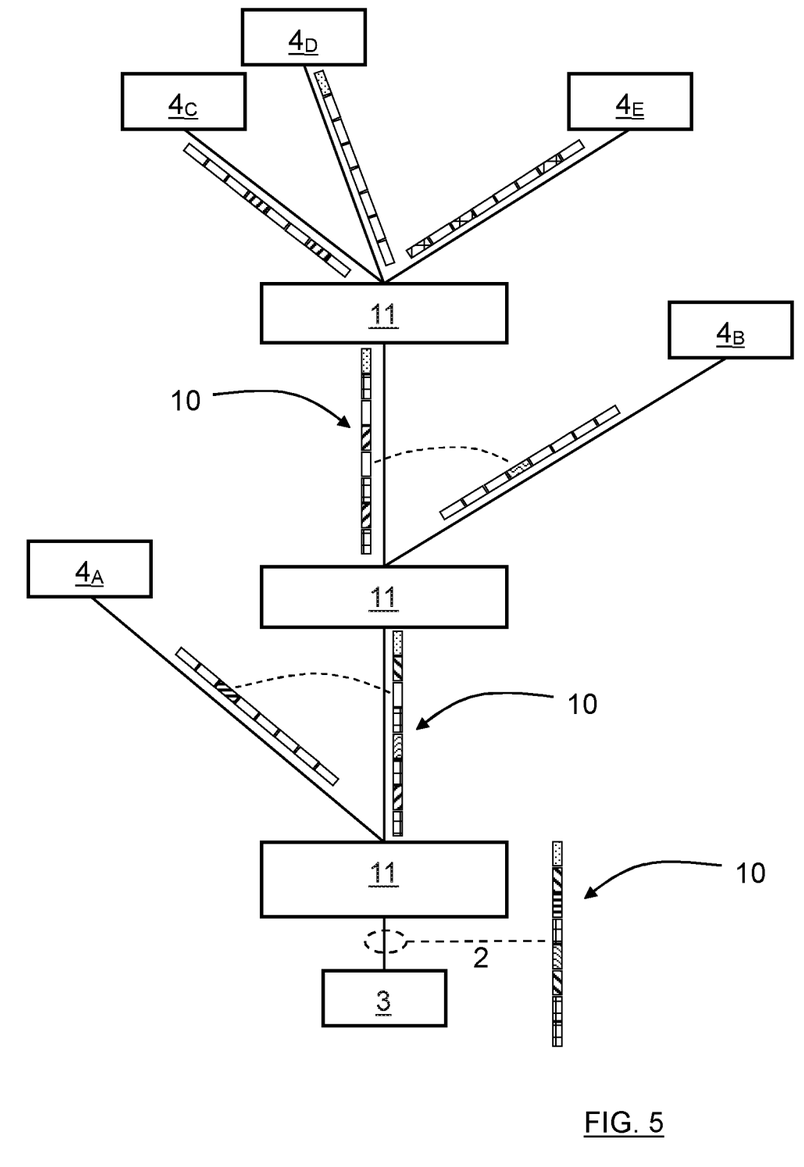
FIG. 5 shows beam-index based multiplexing of data between a baseband unit and radio units.

FIG. 5 schematically illustrates transport of data between radio units 4 and a BB unit 3. According to some aspects, the transporting further comprises multiplexing S51 the data 2 between the BB unit 3 and the radio units 4 onto a common data flow 10 by one or more beam-index based multiplexers (BI-MUX) 11 based on the mapping between the disjoint subsets $DS_1$, $DS_2$, $DS_3$, $DS_4$ of beam indices and the radio units 4. These BI-MUXes will be discussed in more detail below in connection to FIGS. 6-11. The multiplexing may furthermore comprise switching S511 in and out active data slots associated with a radio unit onto a common time division duplex (TDD) data channel between the BB unit 3 and radio units 4 by the BI-MUX 11. This means that the radio units wait for their turn to transmit on the common channel 11, and when the time comes add data to the common channel. This switching in of active data slots is schematically illustrated in FIG. 5.

With reference also to FIG. 12B, the multiplexing may comprise broadcasting S512 the data 2 on a TDD downlink data channel (DL) from the BB unit 3 to each of the radio units 4 addressed by beam index BI, and combining the data 2 from the radio units 4 to the BB unit 3 on a TDD uplink data channel (UL) from the radio units 4 to the BB unit 3, wherein the combining comprises inactive radio units generating an all zero output, whereby multiple uplink transmissions from the radio units 4 can be combined by addition of the outputs from the radio units in a TDD slot.

Figure 11:
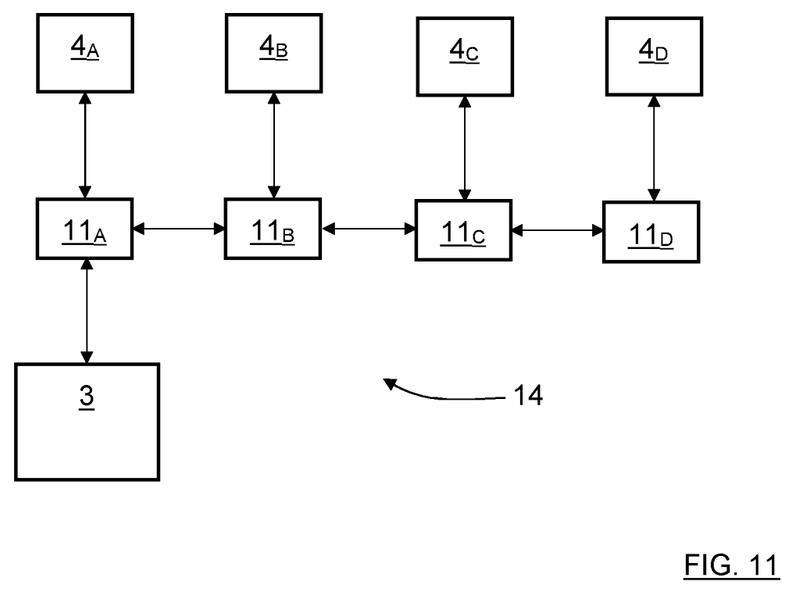
FIG. 11 schematically illustrates a serial configuration of beam-index based multiplexers.

According to some aspects, with reference also to FIG. 11, the transporting comprises multiplexing S52 the data 2 based on a serial configuration 14 of BI-MUXs $11_A$, $11_B$, $11_C$, $11_D$ where each radio unit $4_A$, $4_B$, $4_C$, $4_D$ is connected to a respective common public radio interface (CPRI) or evolved CPRI (eCPRT) beam-index based switch in the serial configuration. This type of serial configuration is schematically illustrated in FIG. 11.

Figure 10:
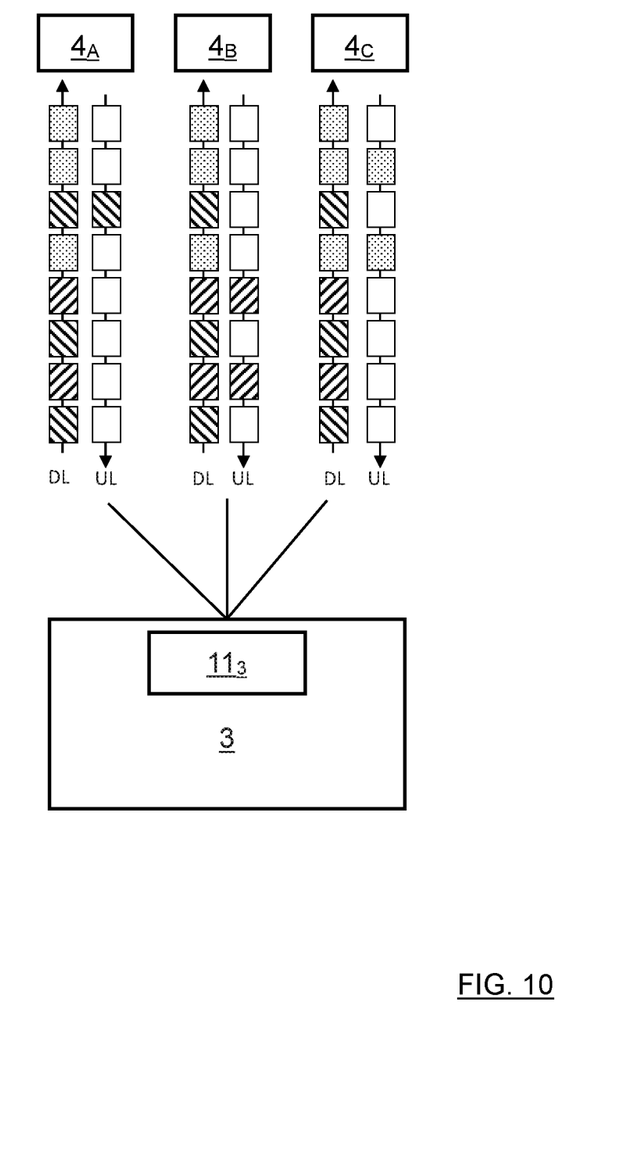
FIG. 10 shows a schematic view of data transport between baseband unit and radio units.

According to some aspects, with reference also to FIG. 10, the transporting comprises multiplexing S53 the data 2 based on a centrally arranged BI-MUX $11_3$ comprised in the baseband unit 3 or on a phased array antenna module (PAAM) of the communication system 1.

With reference to FIG. 2 and FIG. 5-11 that disclose different BI-MUX configurations, the present disclosure relates to a beam-index based multiplexer, BI-MUX, $11_1$, $11_2$, $11_3$; $11_A$, $11_B$, $11_C$, $11_D$ for distributing data 2, 20, 21, 22 between a baseband, BB, unit 3 and two or more radio units $4_A$, $4_B$, $4_C$, $4_D$ in a communication system 1 arranged to cover a service area 6. The BI-MUX $11_1$, $11_2$ comprises at least one upstream port 15 arranged to be at least indirectly connected to the BB unit 3 and a plurality of downstream ports 16 arranged to be at least indirectly connected to the radio units $4_A$, $4_B$, $4_C$. The BI-MUX comprises a configurable mapping between a number of disjoint subsets $DS_1$, $DS_2$, $DS_3$, $DS_4$ of beam indices and the downstream ports 16, whereby the BI-MUX is arranged to distribute a common data flow received on an upstream port to radio units at least indirectly connected to the downstream ports.

Figure 6:
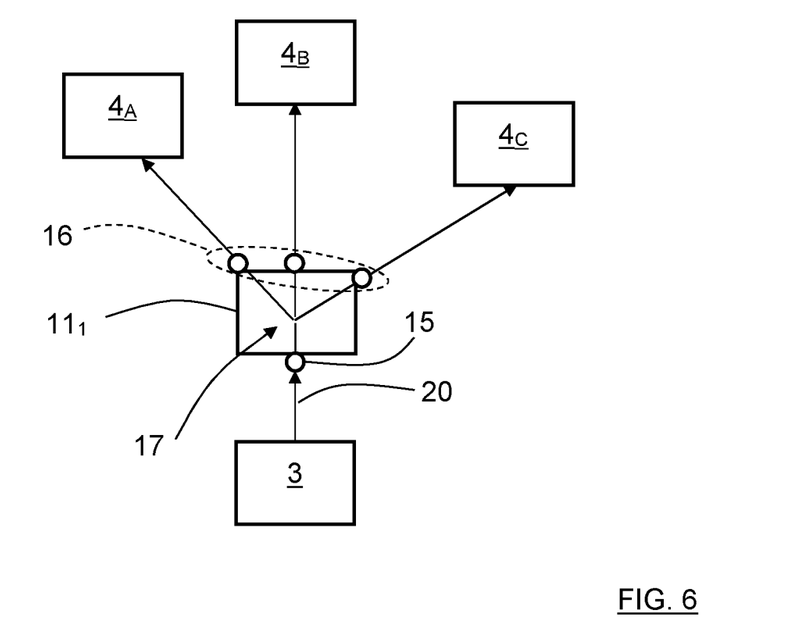
FIG. 6 shows a downlink broadcast multiplexing scheme.
Figure 7:
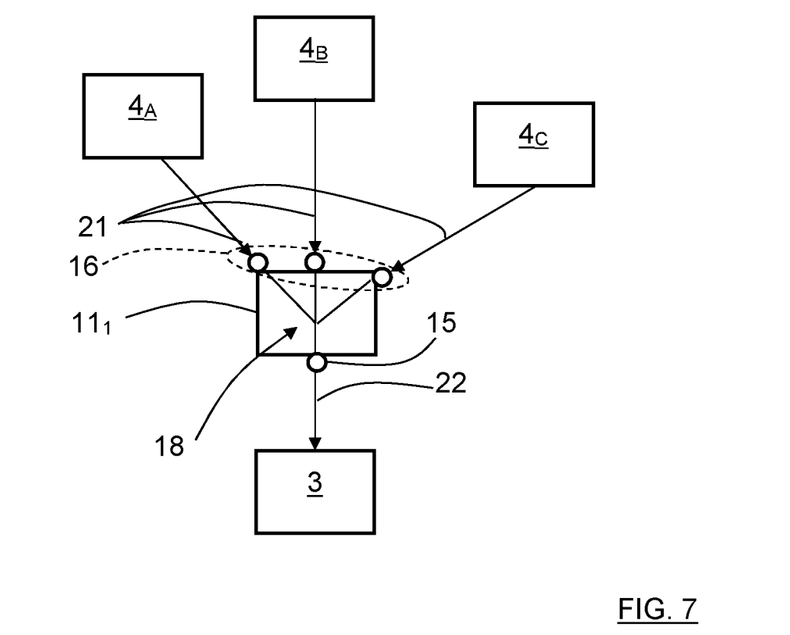
FIG. 7 shows an uplink combining based multiplexing scheme.

According to some aspects, as shown in FIG. 6 and FIG. 7, the BI-MUX $11_1$ is arranged to broadcast the data 22 on a TDD downlink (DL) data channel from the BB unit 3 to each of the radio units $4_A$, $4_B$, $4_C$ addressed by beam index BI, and to combine the data 21 from the radio units $4_A$, $4_B$, $4_C$ to the BB unit 3 on a TDD uplink (UL) data channel from the radio units $4_A$, $4_B$, $4_C$ to the BB unit 3, wherein inactive radio units are adapted to generate an all zero output for the combining, whereby multiple uplink transmissions from the radio units $4_A$, $4_B$, $4_C$ can be combined by addition of the outputs from the radio units in a TDD slot.

According to some aspects, the BI-MUX $11_1$ comprises a broadcasting function 17 that is adapted to broadcast a DL data flow 20 to the downstream ports 16 from the upstream port 15, and a combining function 18 that is adapted to add data flows 21 from the downstream ports 16 and to forward a combined data flow 22 towards the upstream port 15 and the BB unit 3.

Figure 8:
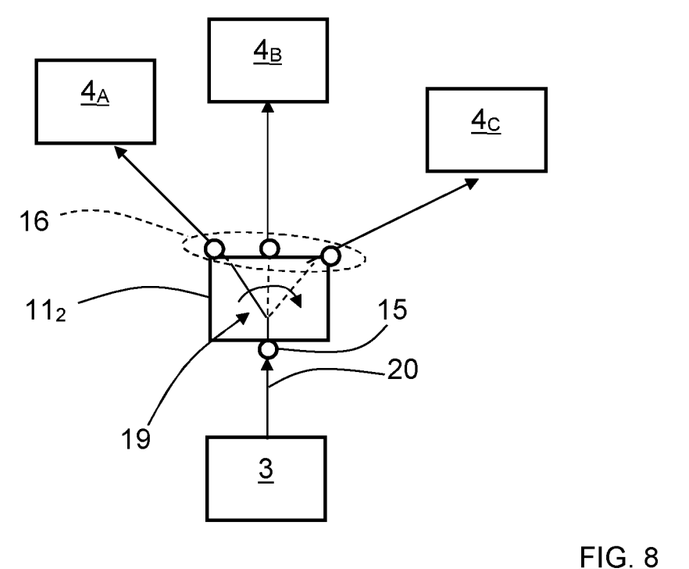
FIG. 8 schematically illustrates a switch for distributing downlink data based on beam-index.
Figure 9:
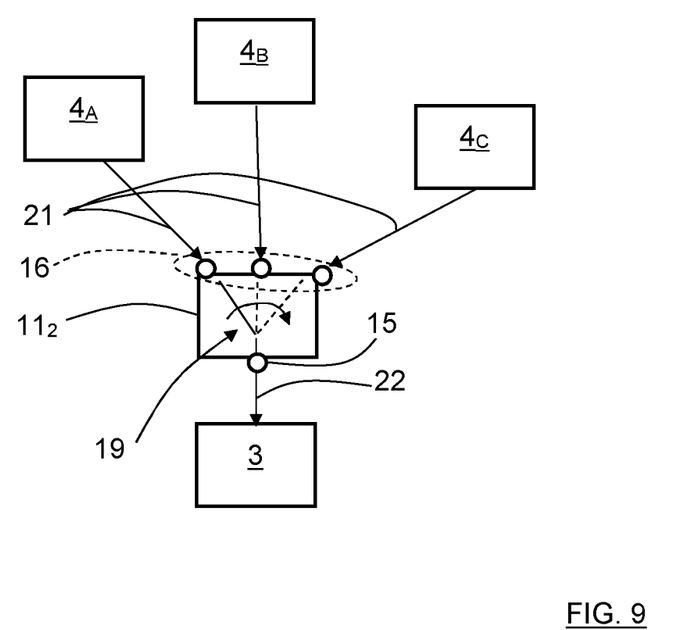
FIG. 9 schematically illustrates a switch for distributing uplink data based on beam-index.

According to some aspects, as shown in FIG. 8 and FIG. 9, the BI-MUX $11_2$ is arranged to switch in and out active data slots associated with a radio unit $4_A$, $4_B$, $4_C$ onto a common time division duplex (TDD) data channel between the BB unit 3 and radio units $4_A$, $4_B$, $4_C$.

According to some aspects, the BI-MUX $11_2$ comprises a switch arrangement 19 that is adapted to distribute a downlink data flow 20 to one downstream port 16 at a time, and to receive uplink data flows 21 from one downstream port 16 at a time, and to forward a combined data flow 22 towards the upstream port 15 and the BB unit 3.

According to some aspects, as shown in FIG. 11, the BI-MUX $11_A$, $11_B$, $11_C$, $11_D$ is comprised in a serial configuration 14 of BI-MUXs $11_A$, $11_B$, $11_C$, $11_D$ where each radio unit $4_A$, $4_B$, $4_C$, $4_D$ is connected to a respective common public radio interface (CPRI) or evolved CPRI (eCPRT) beam-index based switch in the serial configuration.

According to some aspects, as shown in FIG. 11, the BI-MUX $11_3$ is centrally arranged and comprised in the baseband unit 3 or on a phased array antenna module (PAAM) of the communication system 1. This centrally arranged BI-MUX $11_3$ can of course be of any suitable type, for example the previously described BI-MUX $11_1$ that is arranged to broadcast data 22 on a TDD DL data channel from the BB unit 3, and to combine data 21 from the radio units $4_A$, $4_B$, $4_C$ to the BB unit 3 on a TDD uplink.

Generally, the present disclosure relates to a wireless communication system 1 comprising a baseband (BB) unit 3 and two or more radio units 4 arranged to cover a service area 6, wherein the wireless communication system 1 comprises a data transport sub-system arranged to transport data 2 between the BB unit 3 and the two or more radio units 4, wherein the wireless communication system 1 comprises a configured logical grid of beams matrix (GoB) 5 associated with a with a carrier frequency band $B_0$, $B_1$, $B_2$, $B_3$, $B_4$, $B_5$, $B_6$, $B_7$ of the communications network 1, and comprising a set S of beam indices BI, the set S of beam indices being partitioned into disjoint subsets $DS_1$, $DS_2$, $DS_3$, $DS_4$ of beam indices, wherein each of the two of more radio units 4 is mapped to one disjoint subset $DS_1$, $DS_2$, $DS_3$, $DS_4$ such that each disjoint subset is associated with a single radio unit, wherein the data transport sub-system is arranged to transport the data 2 between the BB unit 3 and the two or more radio units 4 and distribute the transported data 2 between the radio units 4 based on the disjoint subsets $DS_1$, $DS_2$, $DS_3$, $DS_4$ of beam indices BI.

According to some aspects, the BB unit 3 is adapted to perform per cell scheduling over the service area 6, based on the GoB 5.

According to some aspects, each beam index BI in a disjoint subset $DS_1$, $DS_2$, $DS_3$, $DS_4$ of beam indices is associated with an antenna radiation pattern 9 of the radio unit 4 mapped to the disjoint sub set.

According to some aspects, each GoB is partitioned into an integer number N of wide beams 7, where each wide beam is further partitioned into one or more subordinate traffic beams 8.

According to some aspects, the GoB is partitioned such that each disjoint subset $DS_1$, $DS_2$, $DS_3$, $DS_4$ of beam indices BI comprises at least one beam index $BI_0$ corresponding to a unique wide beam 7 selected from the N wide beams in the GoB 5.

According to some aspects, the GoB is partitioned such that each disjoint subset $DS_1$, $DS_2$, $DS_3$, $DS_4$ of beam indices BI comprises at least one beam index $BI_1$ corresponding to one or more unique traffic beams 8 selected within a corresponding wide beam 7.

According to some aspects, the data transport sub-system comprises one or more beam-index based multiplexers 11 (BI-MUX) arranged to multiplex the data 2 between the BB unit 3 and the radio units 4 onto a common data flow 10 based on the mapping between the disjoint subsets $DS_1$, $DS_2$, $DS_3$, $DS_4$ of beam indices and the radio units 4.

According to some aspects, the BI-MUX $11_2$ is arranged to switch in and out active data slots associated with a radio unit $4_A$, $4_B$, $4_C$ onto a common time division duplex (TDD) data channel 20, 21 between the BB unit 3 and radio units $4_A$, $4_B$, $4_C$.

According to some aspects, the BI-MUX $11_1$, $11_3$ is arranged to broadcast the data 2 on a TDD downlink (DL) data channel 22, 21 from the BB unit 3 to each of the radio units $4_A$, $4_B$, $4_C$ addressed by beam index BI, and to combine the data 2 from the radio units $4_A$, $4_B$, $4_C$ to the BB unit 3 on a TDD uplink (UL) data channel 21, 22 from the radio units $4_A$, $4_B$, $4_C$ to the BB unit 3, wherein inactive radio units are adapted to generate an all zero output for the combining, whereby multiple uplink transmissions from the radio units $4_A$, $4_B$, $4_C$ can be combined by addition of the outputs from the radio units in a TDD slot.

According to some aspects, the data transport sub-system comprises a serial configuration 14 of BI-MUXs $11_A$, $11_B$, $11_C$, $11_D$ where each radio unit $4_A$, $4_B$, $4_C$, $4_D$ is connected to a respective common public radio interface (CPRI) or evolved CPRI (eCPRI) beam-index based switch in the serial configuration.

According to some aspects, the data transport sub-system comprises a centrally arranged BI-MUX $11_3$ comprised in the baseband unit 3 or on a phased array antenna module (PAAM) of the communication system 1.

According to some aspects, the set S of beam indices is partitioned into one or more broadcasting subsets in addition to the disjoint subsets $DS_1$, $DS_2$, $DS_3$, $DS_4$, and each of the one or more broadcasting subsets of beam indices is mapped to two of more radio units 4.

Figure 13:
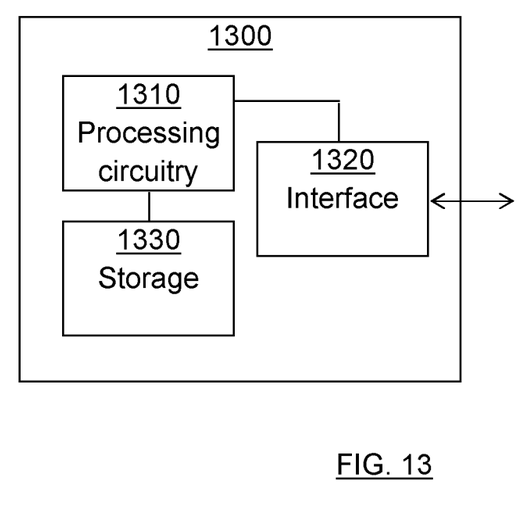
FIG. 13 schematically illustrates processing circuitry.

FIG. 13 schematically illustrates, in terms of a number of functional units, the components of a control unit 1300 comprised in a radio unit, in a BB unit, or in a BI-MUX, according to embodiments of the discussions herein. Processing circuitry 1310 is provided using any combination of one or more of a suitable central processing unit CPU, multiprocessor, microcontroller, digital signal processor DSP, etc., capable of executing software instructions stored in a computer program product, e.g. in the form of a storage medium 1330. The processing circuitry 1310 may further be provided as at least one application specific integrated circuit ASIC, or field programmable gate array FPGA. The processing circuitry thus comprises a plurality of digital logic components.

Particularly, the processing circuitry 1310 is configured to cause the control unit 1300 to perform a set of operations, or steps. For example, the storage medium 1330 may store the set of operations, and the processing circuitry 1310 may be configured to retrieve the set of operations from the storage medium 1330 to cause the control unit 1300 to perform the set of operations. The set of operations may be provided as a set of executable instructions. Thus, the processing circuitry 1310 is thereby arranged to execute methods as herein disclosed.

The storage medium 1330 may also comprise persistent storage, which, for example, can be any single one or combination of magnetic memory, optical memory, solid state memory or even remotely mounted memory.

The sensor control unit 1300 further comprises an interface 1320 for communications with at least one external device. As such the interface 1320 may comprise one or more transmitters and receivers, comprising analogue and digital components and a suitable number of ports for wireline communication.

The processing circuitry 1310 controls the general operation of the control unit 1300, e.g. by sending data and control signals to the interface 1320 and the storage medium 1330, by receiving data and reports from the interface 1320, and by retrieving data and instructions from the storage medium 1330. Other components, as well as the related functionality, of the control node are omitted in order not to obscure the concepts presented herein.

Figure 14:
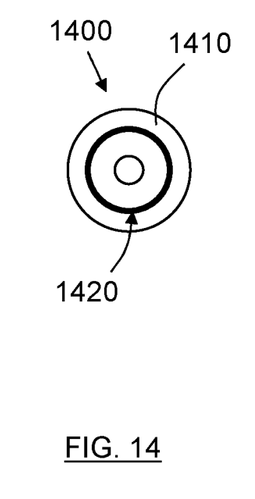
FIG. 14 shows a computer program product.

FIG. 14 shows a computer program product 1400 comprising computer executable instructions 1420 stored on media 1410 to execute any of the methods disclosed herein.

The invention claimed is:

1. A method for transporting and distributing data between a baseband (BB) unit and two or more radio units comprised in a communications network arranged to cover a service area, the method comprising:
   defining a logical grid of beams matrix (GoB) associated with a carrier frequency band of the communications network, wherein the GoB comprises a set of beam indices;
   partitioning the set of beam indices into disjoint subsets of at least one beam index each;
   mapping each of the two or more radio units to one disjoint subset such that each disjoint subset is associated with a single radio unit; and
   transporting the data between the BB unit and the two or more radio units and distributing the transported data between the radio units based on the disjoint subsets of beam indices.

2. The method of claim 1, further comprising performing per cell scheduling, by the BB unit, over the service area, based on the GoB.

3. The method of claim 1, further comprising associating each beam index in a disjoint subset of beam indices with an antenna radiation pattern of the radio unit mapped to the disjoint subset.

4. The method of claim 1, further comprising
   partitioning the GoB into an integer number N of wide beams, where each wide beam is further partitioned into one or more subordinate traffic beams; and
   partitioning the GoB such that each disjoint subset of beam indices comprises at least one beam index (BI0) corresponding to a unique wide beam selected from the N wide beams in the GoB.

5. The method of claim 1, further comprising partitioning the GoB such that each disjoint subset of beam indices comprises at least one beam index corresponding to one or more unique traffic beams selected within a corresponding wide beam.

6. The method of claim 1, wherein
   the transporting further comprises multiplexing the data between the BB unit and the radio units onto a common data flow by one or more beam-index based multiplexers, BI-MUX, based on the mapping between the disjoint subsets of beam indices and the radio units, and
   the multiplexing comprises switching in and out active data slots associated with a radio unit onto a common time division duplex, TDD, data channel between the BB unit and radio units by the BI-MUX.

7. The method of claim 1, wherein
   the transporting further comprises multiplexing the data between the BB unit and the radio units onto a common data flow by one or more beam-index based multiplexers, BI-MUX, based on the mapping between the disjoint subsets of beam indices and the radio units, and
   the multiplexing comprises broadcasting the data on a TDD downlink, DL, data channel from the BB unit to each of the radio units addressed by beam index, and combining the data from the radio units to the BB unit on a TDD uplink, UL, data channel from the radio units to the BB unit, wherein the combining comprises inactive radio units generating an all zero output, whereby multiple uplink transmissions from the radio units can be combined by addition of the outputs from the radio units in a TDD slot.

8. The method of claim 1, wherein the transporting comprises multiplexing the data based on a serial configuration of BI-MUXs where each radio unit is connected to a respective common public radio interface, CPRI, or evolved CPRI, eCPRI, beam-index based switch in the serial configuration.

9. The method of claim 1, wherein the transporting comprises multiplexing the data based on a centrally arranged BI-MUX comprised in the baseband unit or on a phased array antenna module, PAAM, of the communication system.

10. The method of claim 1, further comprising
    partitioning the set of beam indices into one or more broadcasting subsets in addition to the disjoint subsets; and
    mapping each of the one or more broadcasting subsets of beam indices to two of more radio units.

11. A wireless communication system comprising:
    a baseband (BB) unit;
    two or more radio units arranged to cover a service area;
    a data transport sub-system arranged to transport data between the BB unit and the two or more radio units;
    a configured logical grid of beams matrix (GoB) associated with a carrier frequency band of the communications network, and comprising a set of beam indices, the set of beam indices being partitioned into disjoint subsets of beam indices, wherein
    each of the two of more radio units is mapped to one disjoint subset such that each disjoint subset is associated with a single radio unit, and
    the data transport sub-system is arranged to transport the data between the BB unit and the two or more radio units and distribute the transported data between the radio units based on the disjoint subsets of beam indices.

12. The wireless communication system of claim 11, wherein the BB unit is adapted to perform per cell scheduling over the service area, based on the GoB.

13. The wireless communication system of claim 11, wherein each beam index in a disjoint subset of beam indices is associated with an antenna radiation pattern of the radio unit mapped to the disjoint subset.

14. The wireless communication system of claim 11, wherein each GoB is partitioned into an integer number N of wide beams, where each wide beam is further partitioned into one or more subordinate traffic beams, and the GoB is partitioned such that each disjoint subset of beam indices comprises at least one beam index (BI0) corresponding to a unique wide beam selected from the N wide beams in the GoB.

15. The wireless communication system of claim 11, wherein each GoB is partitioned into an integer number N of wide beams, where each wide beam is further partitioned into one or more subordinate traffic beams, and the GoB is partitioned such that each disjoint subset of beam indices comprises at least one beam index corresponding to one or more unique traffic beams selected within a corresponding wide beam.

16. The wireless communication system of claim 11, wherein the data transport sub-system comprises one or more beam-index based multiplexers, BI-MUX, arranged to multiplex the data between the BB unit and the radio units onto a common data flow based on the mapping between the disjoint subsets of beam indices and the radio units, and the BI-MUX is arranged to switch in and out active data slots associated with a radio unit onto a common time division duplex, TDD, data channel between the BB unit and radio units.

17. The wireless communication system of claim 11, wherein the data transport sub-system comprises one or more beam-index based multiplexers, BI-MUX, arranged to multiplex the data between the BB unit and the radio units onto a common data flow based on the mapping between the disjoint subsets of beam indices and the radio units, and the BI-MUX is arranged to broadcast the data on a TDD downlink, DL, data channel (22, 21) from the BB unit to each of the radio units addressed by beam index, and to combine the data from the radio units to the BB unit on a TDD uplink, UL, data channel from the radio units to the BB unit, wherein inactive radio units are adapted to generate an all zero output for the combining, whereby multiple uplink transmissions from the radio units can be combined by addition of the outputs from the radio units in a TDD slot.

18. The wireless communication system of claim 11, wherein the data transport sub-system comprises a serial configuration of BI-MUXs where each radio unit is connected to a respective common public radio interface, CPRI, or evolved CPRI, eCPRI, beam-index based switch in the serial configuration.

19. The wireless communication system of claim 11, wherein the data transport sub-system comprises a centrally arranged BI-MUX comprised in the baseband unit or on a phased array antenna module, PAAM, of the communication system.

20. The wireless communication system of claim 11, wherein the set of beam indices is partitioned into one or more broadcasting subsets in addition to the disjoint subsets, and each of the one or more broadcasting subsets of beam indices is mapped to two of more radio units.

21. A beam-index based multiplexer (BI-MUX) for distributing data between a baseband (BB) unit and two or more radio units in a communication system arranged to cover a service area, the BI-MUX comprising:

at least one upstream port arranged to be at least indirectly connected to the BB unit; and a plurality of downstream ports arranged to be at least indirectly connected to the radio units; and a configurable mapping between a number of disjoint subsets of beam indices and the downstream ports, wherein the BI-MUX is arranged to distribute a common data flow received on an upstream port to radio units at least indirectly connected to the downstream ports.

22. The BI-MUX of claim 21, wherein the BI-MUX is arranged to broadcast the data on a TDD downlink, DL, data channel from the BB unit to each of the radio units addressed by beam index, and to combine the data from the radio units to the BB unit on a TDD uplink, UL, data channel from the radio units to the BB unit, wherein inactive radio units are adapted to generate an all zero output for the combining, whereby multiple uplink transmissions from the radio units can be combined by addition of the outputs from the radio units in a TDD slot.

23. The BI-MUX of claim 22, wherein the BI-MUX comprises a broadcasting function that is adapted to broadcast a DL data flow to the downstream ports from the upstream port, and a combining function that is adapted to add data flows from the downstream ports and to forward a combined data flow towards the upstream port and the BB unit.

24. The BI-MUX of claim 21, wherein the BI-MUX is arranged to switch in and out active data slots associated with a radio unit onto a common time division duplex, TDD, data channel between the BB unit and radio units, and the BI-MUX comprises a switch arrangement that is adapted to distribute a downlink data flow to one downstream port at a time, and to receive uplink data flows from one downstream port at a time, and to forward a combined data flow towards the upstream port and the BB unit.

25. The BI-MUX of claim 21, wherein the BI-MUX is comprised in a serial configuration of BI-MUXs where each radio unit is connected to a respective common public radio interface, CPRI, or evolved CPRI, eCPRI, beam-index based switch in the serial configuration.

26. The BI-MUX of claim 21, wherein the BI-MUX is centrally arranged and comprised in the baseband unit or on a phased array antenna module, PAAM, of the communication system.

* * * * *

UNITED STATES PATENT AND TRADEMARK OFFICE
CERTIFICATE OF CORRECTION

| | |
|---|---|
| PATENT NO. | : 12,040,872 B2 |
| APPLICATION NO. | : 17/923548 |
| DATED | : July 16, 2024 |
| INVENTOR(S) | : Woxberg et al. |

It is certified that error appears in the above-identified patent and that said Letters Patent is hereby corrected as shown below:

In the Specification

In Column 1, Line 24, delete "program" and insert -- project --, therefor.

In Column 3, Line 38, delete "(eCPRT)" and insert -- (eCPRI) --, therefor.

In Column 4, Line 47, delete "program)" and insert -- project) --, therefor.

In Column 8, Line 34, delete "(eCPRT)" and insert -- (eCPRI) --, therefor.

In Column 9, Line 26, delete "(eCPRT)" and insert -- (eCPRI) --, therefor.

Signed and Sealed this
Twenty-ninth Day of October, 2024

Katherine Kelly Vidal
*Director of the United States Patent and Trademark Office*